United States Patent [19]

Marks et al.

[11] 3,819,124

[45] June 25, 1974

[54] CUSHION FLANGE REEL

[75] Inventors: Harlen L. Marks, Roseville; Norman C. Ritter, Mounds View, both of Minn.

[73] Assignee: Minnesota Mining and Manufacturing Company, St. Paul, Minn.

[22] Filed: June 23, 1971

[21] Appl. No.: 155,775

[52] U.S. Cl. ............ 242/71.8, 206/59 E, 242/118.7

[51] Int. Cl. ........................ B65h 75/14, B65h 75/18

[58] Field of Search ............ 242/118.7, 118.4, 71.8, 242/78.6, 117, 118; 206/65 Y, 59 R, 59 C, 59 E, 59 F

[56] References Cited

UNITED STATES PATENTS

| | | | |
|---|---|---|---|
| 1,497,074 | 6/1924 | Duden | 242/71.8 |
| 3,116,033 | 12/1963 | Bock | 242/118.4 |
| 3,342,435 | 9/1967 | Gelardi et al. | 242/71.8 |
| 3,399,761 | 9/1968 | Hayashi | 206/65 Y |
| 3,592,406 | 7/1971 | Martin et al. | 242/117 |

*Primary Examiner*—George F. Mautz
*Attorney, Agent, or Firm*—Alexander, Sell, Steldt & DeLaHunt

[57] ABSTRACT

A reel for storing magnetic recording tape wound upon itself. At least one flange of the reel includes a layer of cushioning material on its inner surface which protects lengths of the tape projecting axially from the edge surface of a wound tape toward the flange when the flange impinges against the tape.

11 Claims, 2 Drawing Figures

INVENTORS
HARLEN L. MARKS
NORMAN C. RITTER
BY Kinney, Alexander, Sell, Steldt & DeLaHunt
ATTORNEYS

CUSHION FLANGE REEL

FIELD OF THE INVENTION

This invention relates to reels for storing tape, and in one aspect relates to a reel having a flange affording protection to lengths of video recording tape projecting axially toward the flange from the edge surface of a wound tape.

DESCRIPTION OF THE PRIOR ART

Magnetic recording tape unevenly wound on a reel presents the problem of protecting the edges of lengths of the tape which may project edgewise or axially from the edge surface of the wound tape. These projecting lengths are particularly vulnerable to damage.

Recording tape may be unevenly wound during manufacture or in subsequent use, or convolutions of tape on a reel may become displaced due to temperature changes and/or rough handling. Projecting lengths of tape caused by these means are termed "stepped strands" or "popped strands" in the industry.

Uneven winding of video recording tape often occurs during its use on a video recorder or reproducer. Video recorders or reproducers are normally trammed to wind the tape essentially in edge contact with one flange of the take-up reel, thus spacing the opposite edge of the wound tape from the opposing flange. Frequently, however, the recorder is stopped, as when a commercial announcement is inserted or the direction of travel of the tape is to be reversed. When the recorder is re-started the tape often briefly shifts axially away from the tramming flange to leave one or more convolutions of the tape (popped strands) projecting into the space between the wound tape and the opposing flange.

The popped strands can be removed by rewinding the tape without interruption from one reel to another, but this is seldom done by users. Thus, the popped strands, which may extend a distance up to the difference between the tape width and the spacing between the flanges (typically up to 0.02 inch beyond the edge surface of the wound tape), are often present during shipment of the reel to a subsequent user.

During shipment a tape reel typically receives rough handling which may include being dropped or receiving other impacts. The flanges on a reel for video recording tape typically project about 4 or 6 inches from its hub. Sharp impacts will cause the cantilevered reel flange spaced from the edge surface of the wound tape to deflect and hammer the edges of any popped strands, causing edge damage including creasing or rolling of the edge. Edge damage on the video recording tape may cause loss of the sound track which is located adjacent the edge, or the rotating video reproducing head which is closely spaced from the passing tape may snag a damaged edge and tear the tape.

Attempts have been made to protect the popped strands from hammering by the flange upon impact of the reel. For example, a stiff, plastic collar has been wedged between the portions of the reel flanges which extend beyond the wound tape. Such a collar affords some measure of protection; however, damage to the popped strands is still experienced.

An attempt has been made to eliminate the popped strands by reducing the spacing between the reel flanges to essentially the width of the tape. The use of reels of this configuration, however, produced other problems including loose winding and edge damage to the tape upon winding, which made this approach unacceptable.

SUMMARY OF THE INVENTION

A reel for recording tape made according to the present invention prevents damage to popped strands upon impact of the reel.

According to the present invention there is provided a reel comprising a hub and two circular flanges having generally parallel inner faces for storing a tape of a given width wound upon itself about the hub. The inner faces of the flanges are spaced from each other a distance exceeding the given tape width by a predetermined extent. At least one of the flanges includes a layer of resilient cushioning material defining most of the inner face of the flange. The cushioning material has a sufficiently low compressive strength when compressed a distance equal to the predetermined extent by which the flange spacing exceeds the given tape width so that the cushioning material will yield to protect the popped strands of wound tape when the cushioning flange impinges against the tape.

The distance between the flanges of a reel for magnetic recording tape should exceed the width of the recording tape by a predetermined extent of from 0.01 to 0.05 inch. Below 0.01 inch clearance loose winding or edge damage to the tape may occur. Above 0.01 inch and up to 0.05 inch clearance permits proper winding of the tape while reasonably limiting the distance to which a popped strand may extend.

The thickness of the cushioning material is dependent upon the maximum distance a popped strand may extend and upon the compressibility of the cushioning material. The cushioning material should have sufficient minimum thickness to entirely receive any popped strand without compressing to solid height. This minimum thickness for low density foam cushioning materials is about two times the potential popped strand penetration, or two times the difference between the tape width and the spacing between the flanges. The only limitation on the maximum thickness of the cushioning material is the practical consideration of providing a reasonably thin flange.

A popped strand consisting of a single convolution of video recording tape having a polyester backing of 0.0009 inch thickness withstands compressive forces of about 30 pounds per square inch without edge damage. Thus, if the cushioning material compressed a distance equal to the extent of the maximum potential popped strand under a force of about 30 psi, the popped strand would not be damaged. To illustrate, a cushioning material having a compression strength of 30 psi at 25 percent deflection and at least 0.12 inch in thickness will yield to protect a popped strand extending to 0.03 inch.

The preceding discussion indicates static compressive strength ratings (ASTM D-1056) for the cushioning material related to protection afforded popped strands during dynamic testing. It is known, however, that the dynamic compressive strength of a cushioning material cannot be entirely predicted from its static compressive strength. For example, at the high rate at which a popped strand is normally forced against the cushioning material, the compression of a foam cushioning material is in part dependent upon its rate of air release from or through the cells. Thus, while the preceding figures provide sound guidelines for selecting cushioning materials, each material should be individually tested to insure that it performs satisfactorily under dynamic loading.

The cushioning material should also provide generally elastic compression under forces at least as great as one psi to provide protection for wound tape on a reel during repeated impact loadings of the reel without a significant compression set in areas of the cushioning material not positioned adjacent a popped strand. To test for this, a series of weights providing increasing loadings are positioned on the cushioning material and removed after 30 minutes. If no compression set is visually observed 15 minutes after removal of a weight, the cushioning material is considered to provide elastic compression under such force.

Commercially available cushioning materials, which are available within the given range of compression strengths and resilience and have suitable characteristics under dynamic loading, and which have been shown to be useful, include certain polyethylene and rubber-modified polypropylene foams. These cushioning materials were found to be essentially non-abrasive, thus avoiding edge damage to the tape if contact between the tape and the cushioning material should occur during winding. Additionally, these cushioning materials exhibited no transfer to the tape as by dusting or contact transfer.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENT

Figure 1:
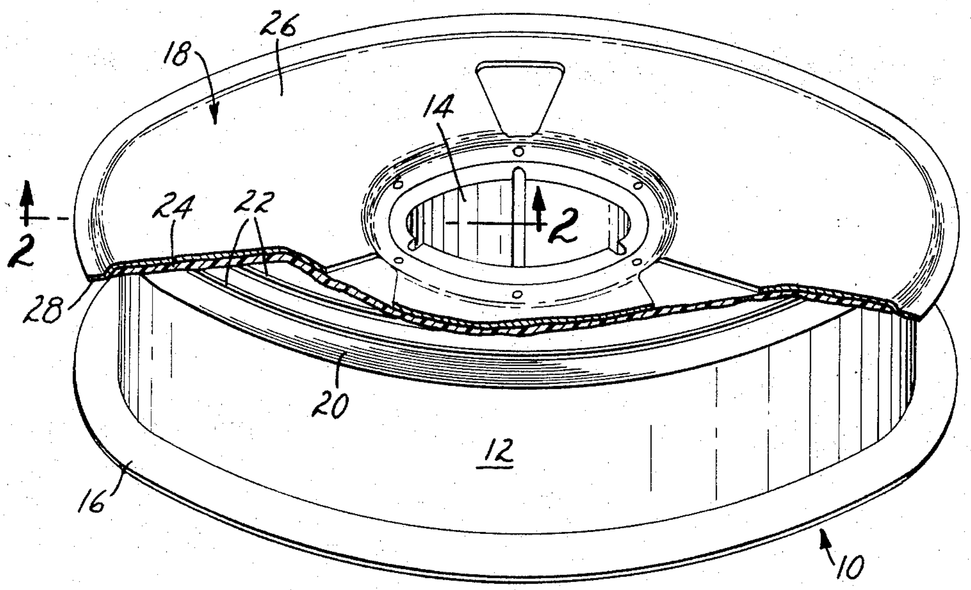
FIG. 1 is a view in perspective of a reel of the present invention with one flange broken away in part.

FIG. 1 shows a reel 10 of the present invention for the storage of a length of magnetic recording tape 12 of a given width. The reel 10 comprises a hub 14 to which are attached a pair of spaced circular flanges having generally parallel inner faces. The flanges include a flange 16 having a firm inner face and a cushion flange 18.

The cushion flange 18 comprises a rigid support member 26 having an inwardly extending annular rim 28 formed about its periphery to form a portion of the inner face of the cushion flange 18 and provide a firm guiding surface which cooperates with the flange 16 to guide the tape 12 when it is wound upon the reel 10. The cushion flange also comprises a circular layer 24 of cushioning material attached as by an adhesive in a recess defined in the support member 26 between the hub 14 and the rim 28. The exposed surface of the cushioning layer 24 which comprises most of the inner face of the cushion flange 18 is slightly recessed below the plane defined by the guiding surface of the rim 28. Thus the rim 28 which is at the periphery of the cushioning layer 24 restricts contact between the tape being wound on a reel 10 and the cushioning layer 24.

As illustrated, the tape 12 has been wound upon itself on the hub 14 essentially flush with the flange 16. Several lengths of the tape 12, however, extend from an edge surface 20 of the wound tape 12. Each projecting length is herein referred to as a popped strand 22. As may be best seen in FIG. 2, the cushion flange 18 is spaced from the edge surface of the coiled tape 12, and the popped strands 22 may extend from the coil at varying distances limited to a predetermined extent by the difference between the width of the tape 12 and the spacing between the flange 16 and the rim 28.

The thickness and material of the cushioning layer 24 are selected to yield to receive a popped strand 22 without damage to the popped strand 22 when the cushion flange impinges the edge surface 20 of the coiled tape 12. Additionally, the cushioning layer 24 is selected to provide generally resilient contact with the edge surface 20 of the coil to prevent a significant compression set of the cushioning layer 24 not positioned adjacent a popped strand 22.

The invention will be better understood with reference to the following non-limiting examples:

A series of reels 10 were constructed for use with 2-inch wide video recording tape 12 comprising a 0.0009 inch polyester backing with a 0.0005 inch magnetizable coating. Each reel was 14 inches in diameter, with a 4½ inch diameter hub 14, and the spacing between the guide flange 16 and the lip 28 of the cushion flange 18 was 2.02 inches, thereby allowing popped strands 22 to extend as much as 0.02 inch from the edge surface 20 of the coiled tape. Each cushion flange was 0.18 inch thick, including a 0.09-inch thick layer of cushioning material.

Two-inch video recording tape was wound on each reel 10, and winding was interrupted to provide a series of popped strands 22 extending as much as 0.02 inch from the edge surface 20 of the coiled tape toward the cushion flange 18. Various materials were used for the layers of cushioning material in the reels. Tests were performed with the reels to determine the ability of the various cushioning materials to yield to protect the popped strands 22 by dropping each reel 10 (which weighed about 20 pounds) onto its side from heights of 3 to 4 feet.

None of the popped strands evidenced any suitable damage when the cushioning material was a cross-linked polyethylene foam having fine cell structure (0.002 – 0.003 inch cell size), a density of 2 pounds per cubic foot, and a compression strength of 6 pounds per square inch at 25 percent deflection (Haskon Minicel L-200). A 0.12 inch thickness of this material evidenced no visible compression set 15 minutes after removal of a 1 psi load which had been applied for 30 minutes. A 2 psi load applied to the same material for 30 minutes left an edge mark which was barely visible to the naked eye 15 minutes after the load was removed, but it was adjudged that essentially elastic compression had been experienced. A 3 psi load applied to the same material for 30 minutes left a slight compressive set which was still visible 15 minutes after removal of the load.

The popped strands did not evidence edge damage due to creasing or rolling, although signs of strain were observed in some of the popped strands, when the cushioning material was a rubber-modified polypropylene foam of extremely fine cell structure, having a density of about 3 pounds per cubic foot, and a compressive strength of 20 pounds per square inch at 25 percent deflection and 33 psi at 50 percent deflection (Haskon Minicel B-302). This material evidenced no visible compression set 15 minutes after removal of a 3 psi load which had been applied for 30 minutes.

None of the popped strands evidenced creasing or rolling, although signs of strain were observed in some of the popped strands, when the cushioning material was a polyethylene foam having an average cell size of about 1 millimeter, a density of about 2 pounds per cubic foot, and a compression strength of 10 psi at 10 percent deflection and 40 psi at 50 percent deflection (Ethafoam 220). This material evidenced no visible compression set 15 minutes after removal of a 3 psi load which had been applied for 30 minutes. The Ethafoam showed a slight degree of dusting, which might be considered objectionable.

Figure 2:
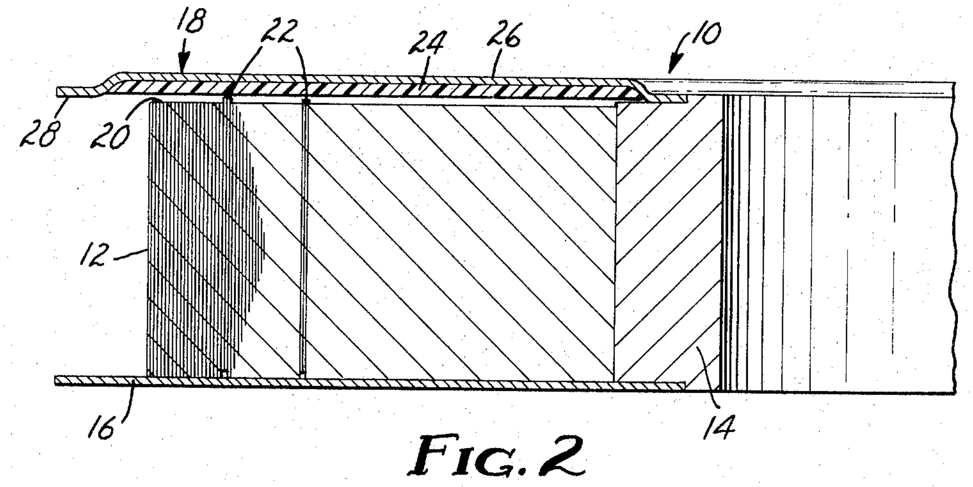
FIG. 2 is a fragmentary sectional view of the reel of FIG. 1 taken approximately along section 2—2 of FIG. 1.

The reel 10 embodying the present invention as illustrated in FIGS. 1 and 2 includes only one cushion flange 18. Reels used in application where the tape 12 is not wound essentially into edge contact with a flange may require a pair of cushion flanges with opposed layers 24 of cushioning material to afford protection for lengths of tape extending from both edge surfaces of the wound tape.

What is claimed is:

1. A reel comprising a hub and two spaced circular flanges having generally parallel inner faces and a tape of a given width wound upon itself on the hub, the inner faces of said flanges being spaced from each other a distance exceeding said given tape width by a predetermined difference, at least one of the flanges including a layer of resilient cushioning material defining most of its inner face, said layer of cushioning material having a thickness greater than said predetermined difference, having a compressive strength of less than 30 psi when compressed equal to said predetermined difference, and experiencing elastic compression at 1 psi loading, which layer of cushioning material yields to protect popped strands of a wound tape when the cushion flange impinges the tape.

2. The reel of claim 1 wherein said cushion flange includes an inwardly extending annular rim at the periphery of the layer of cushioning material to define a firm guiding surface generally aligned with the inner face of the flange defined by the cushioning material.

3. The reel of claim 2 wherein the exposed surface of the layer of cushioning material is slightly recessed below the plane defined by the guiding surface of said rim.

4. The reel of claim 1 wherein the tape is a magnetic recording tape.

5. The reel of claim 1 wherein said cushioning material comprises a cross-linked polyethylene foam having compressive strengths of about 3, 6 and 14 psi at 10, 25 and 50 percent deflection respectively.

6. The reel of claim 5 wherein said predetermined extent by which the flange spacing exceeds the given tape width is 0.02 inch and the thickness of the layer of cushioning material is 0.09 inch.

7. The reel of claim 1 wherein said cushioning material is a polyethylene or polypropylene foam.

8. A reel comprising a hub and two spaced circular flanges having generally parallel inner faces for storing a tape of a given width wound upon itself on the hub, the spacing between the inner faces of said flanges exceeding the given tape width by 0.01 to 0.05 inch, the inner face of one of said flanges being a firm surface against which the tape is normally wound, the other flange comprising a support member formed with a narrow annular inwardly extending rim at its periphery to define a firm tape guiding surface and a layer of resilient cushioning material of cellular structure mounted on said support member between said annular rim and said hub, said layer of cushioning material having a thickness of greater than twice the difference between the flange spacing and the given tape width, having a compressive strength of less than 20 psi when compressed equal to said difference, and experiencing elastic compression at 1 psi loading, which layer of cushioning material yields to protect popped strands of a wound tape when the cushion flange impinges the tape.

9. The reel of claim 8 wherein said cushioning material is a polyethylene or polypropylene foam.

10. The reel of claim 8 wherein said cushioning material comprises a cross-linked polyethylene foam having compressive strengths of about 3, 6 and 14 psi at 10, 25 and 50 percent deflection respectively.

11. The reel of claim 10 wherein said predetermined extent by which the flange spacing exceeds the given tape width is 0.02 inch and the thickness of the layer of cushioning material is 0.09 inch.

* * * * *

UNITED STATES PATENT OFFICE
CERTIFICATE OF CORRECTION

Patent No. 3,819,124 Dated June 25, 1974

Inventor(s) Harlen L. Marks and Norman C. Ritter

It is certified that error appears in the above-identified patent and that said Letters Patent are hereby corrected as shown below:

Column 4, line 45, change "suitable" to -- visible --.

Signed and sealed this 1st day of October 1974.

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 0—366-334